UNITED STATES PATENT OFFICE.

JAMES LAMBERT, OF SAYRE, PENNSYLVANIA.

COMPOUND FOR PROTECTING TREES.

SPECIFICATION forming part of Letters Patent No. 658,953, dated October 2, 1900.

Application filed July 21, 1900. Serial No. 24,387. (No specimens.)

*To all whom it may concern:*

Be it known that I, JAMES LAMBERT, a citizen of the United States, residing at Sayre, in the county of Bradford and State of Pennsylvania, have invented a certain new and useful composition of matter to be used as a preparation for protecting trees, &c., from worms and insects; and I do hereby declare the following to be a full, clear, and exact description of the invention, such as will enable others skilled in the art to which it appertains to make and use the same.

This invention relates to insecticides, and more particularly to preparations for protecting trees from worms and insects.

The object of the invention is to provide a simple and thoroughly-efficient insecticide composition which may be readily applied in the form of a paste or paint to the bodies of trees, shrubs, or plants, and strongly adhere thereto, and which will not be injurious to the life of the tree or plant.

To this end the invention consists in a composition of matter comprising the following ingredients in suitable proportions, to wit: sulphur, wood-ashes, and linseed-oil mixed and compounded together substantially as hereinafter described.

In carrying out my invention I preferably use the several ingredients mentioned in about the following proportions—viz., one pound each of the sulphur and wood-ashes to one gallon of linseed-oil, (preferably raw oil.) The said ingredients are compounded together and the composition rendered homogeneous by first mixing the sulphur (or the ashes, if desired) with the required amount of oil, adding and thoroughly mixing the remaining ingredient and stirring the mass to the consistency of a paste. Should the preparation become settled or too thick after standing for some time, the required consistency may be easily restored by the addition of a small quantity of the oil. A very simple and efficient insecticide is thus produced, which may be readily applied as a paste or paint to the bodies of trees, shrubs, or plants by a brush or other suitable means. The linseed-oil contained in the paste not only facilitates the application thereof, but also renders it adhesive and prevents it from being rubbed or washed from the trees, thus losing the effect of the other ingredients. Besides preventing worms, borers, or other pests from climbing on or entering the bark of the trees, shrubs, or bushes to which the paste is applied, the composition will penetrate the bark and by virtue of the sulphur and wood-ash properties destroy all insect life therein. Unlike many similar preparations, however, the present composition contains no injurious matter and is entirely harmless to plant life, tending, rather, by virtue of the wood-ashes, to invigorate the growth of the trees and to quicken the renewal of any portion eaten by insects or otherwise injured.

It will be understood, of course, that the ingredients mentioned may be mixed and compounded together in other proportions and in different ways than herein stated, though the proportions and method of mixing named have been found to produce the best results.

Having thus fully described my invention, what I claim as new, and desire to secure by Letters Patent of the United States, is—

1. As an insecticide, the herein-described composition of matter consisting of linseed-oil, sulphur and wood-ashes.

2. A paste for protecting trees and the like from worms and insects, consisting of linseed-oil, sulphur and wood-ashes combined together in the following proportions, to wit: one pound each of the sulphur and wood-ashes to one gallon of linseed-oil.

In testimony whereof I affix my signature in presence of two witnesses.

JAMES LAMBERT.

Witnesses:
JOHN DUHLSTINE,
CHARLES DUHLSTINE.